Figure 5:
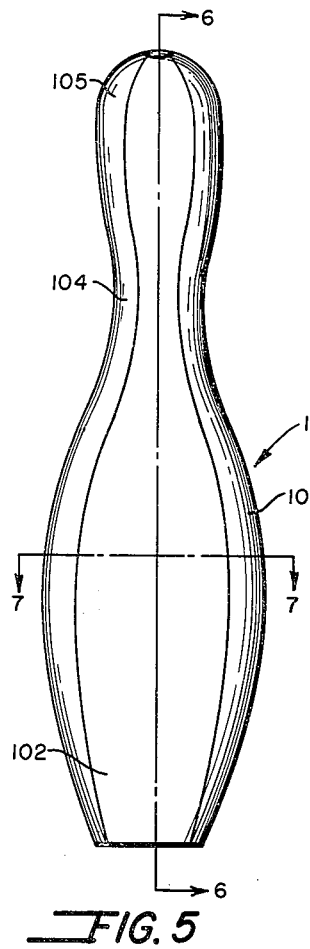

Nov. 13, 1962 C. D. DOSKER 3,063,485
METHOD OF MAKING BOWLING PINS AND SEGMENTS THEREOF
Filed May 15, 1961 5 Sheets-Sheet 1
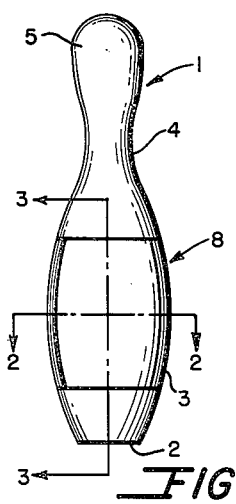
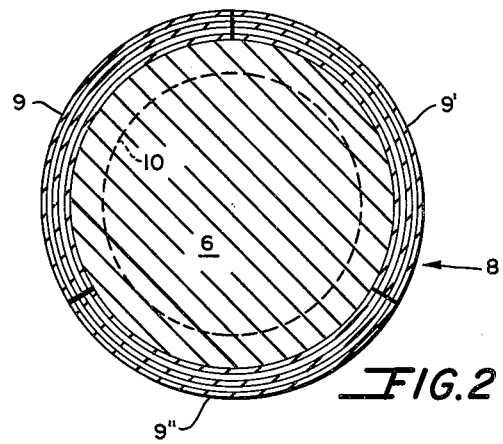
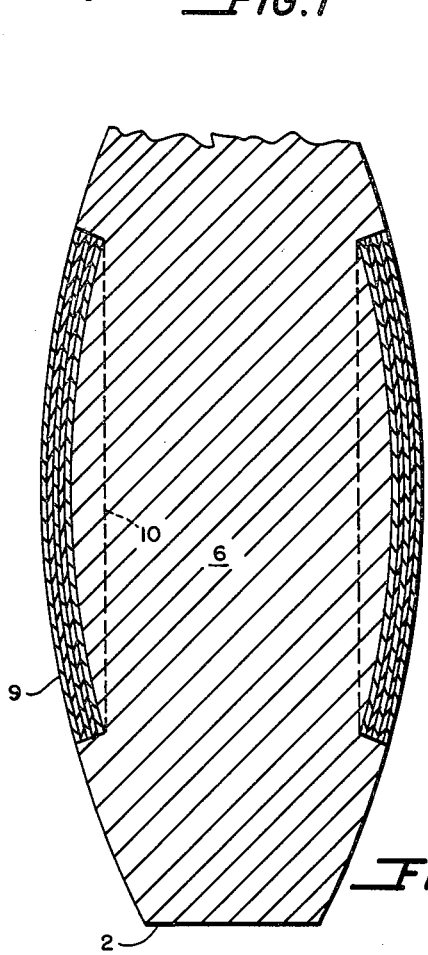
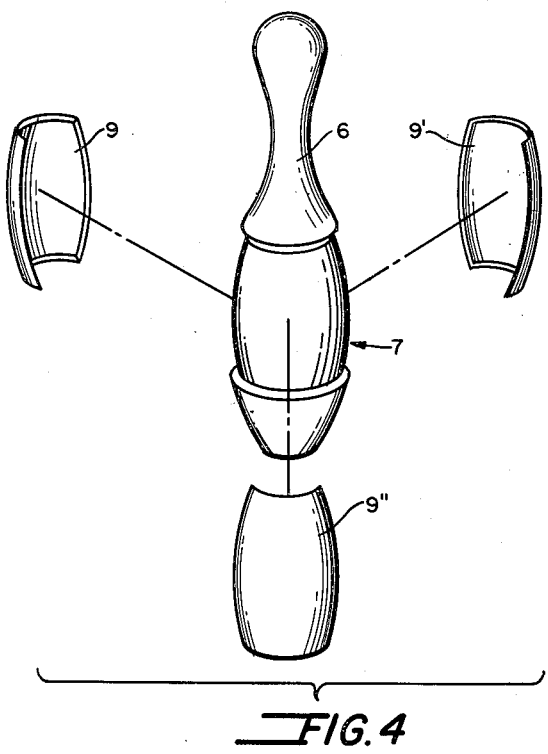
INVENTOR.
CORNELIUS D. DOSKER
BY
ATTORNEY Nov. 13, 1962 C. D. DOSKER 3,063,485
METHOD OF MAKING BOWLING PINS AND SEGMENTS THEREOF
Filed May 15, 1961 5 Sheets-Sheet 2

INVENTOR.
CORNELIUS D. DOSKER
BY
ATTORNEY

Nov. 13, 1962 C. D. DOSKER 3,063,485
METHOD OF MAKING BOWLING PINS AND SEGMENTS THEREOF
Filed May 15, 1961 5 Sheets-Sheet 3

INVENTOR.
CORNELIUS D. DOSKER
BY
Arthur H Robert
ATTORNEY

Nov. 13, 1962     C. D. DOSKER     3,063,485
METHOD OF MAKING BOWLING PINS AND SEGMENTS THEREOF
Filed May 15, 1961     5 Sheets-Sheet 4

INVENTOR.
CORNELIUS D. DOSKER
BY
*Arthur Robert*
ATTORNEY

Nov. 13, 1962 C. D. DOSKER 3,063,485
METHOD OF MAKING BOWLING PINS AND SEGMENTS THEREOF
Filed May 15, 1961 5 Sheets-Sheet 5

INVENTOR.
CORNELIUS D. DOSKER
BY
ATTORNEY 3,063,485
METHOD OF MAKING BOWLING PINS
AND SEGMENTS THEREOF
Cornelius D. Dosker, Louisville, Ky., assignor to Gamble Brothers, Inc., Louisville, Ky., a corporation of Kentucky
Filed May 15, 1961, Ser. No. 114,268
10 Claims. (Cl. 144—315)

This invention relates generally to the art of making wooden bowling pins and, more particularly, to a method of making pins of the spherical belly type conventionally having a spherically convex impact zone extending in the horizontal direction circularly around (and in the vertical direction convexly across) the belly of the pin and being more or less centered on an equator which encircles the pin in the horizontal plane of its maximum belly diameter. This application is a continuation-in-part of my two earlier filed copending applications, Ser. No. 695,391, filed November 8, 1957, and forfeited and Ser. No. 733,996, filed May 8, 1958, and abandoned.

A bowling pin of the spherical belly type is universally made from a solid or laminated block of hard maple having a length slightly greater than the height of the pin and a square cross-section large enough to embrace the equator of the pin. The block presents four rectangular vertically-elongate faces, each of which is characterized by longitudinal grain or "long grain", which may be "flat grain" or "edge grain" or "rift grain." Long grain extends vertically in the block as it did in the tree. In an over-simplified way, long grain wood may be viewed as being composed of a longitudinally elongate succession of relatively short fibers interconnected with each other to form an elongate chain-like network which is characterized by elongate tubular channels or ducts.

The turning of the block to the shape of a bowling pin involves cutting the impact zone-forming portion of each face in a spherically convex manner. Where flat grain is being cut, the edges of the outermost surface layer of wood will show up as a small "circle" (or oval) centered on the equator of the pin while the edges of successive underlying layers will show up as progressively larger and more or less concentric "circles" (or ovals). Where edge grain is being cut, the edges of successive vertically-extending side-by-side layers of wood will show up as parallel lines centered on and extending vertically across the equator.

In each case, vertically-extending wood fiber chains, contained in the flat grain circles or in the edge grain lines of each layer of wood which is cut, are transversely severed above and below the equator so that the impact zone surface of the pin is characterized not only by relatively short chains of fibers extending vertically across the equator of the pin but also by a multitude of end grain openings located both above and below the equator. These end grain openings are formed in the surface of the pin by the severed ends of the tubular ducts in the cut chains of surface layers and of underlying layers.

During use, bowling pins repeatedly encounter violent impacts. As a result, they become so damaged, particularly in the central area which embraces the ball-line and the equator, as to require frequent replacement. In my opinion, this rapid development of damage is due, among other things, (a) to the presence of vertically short chains of network fibers along the equator and of end grain openings above and below the equator in both flat grain and edge grain pins and (b) to the presence of small circular slab-like layers along the equator of flat grain pins.

For example, a violent impact in the central area pinpoints a relatively high stress on a relatively short chain of network fibers. This network is operative to distribute and dissipate this high stress only over the relatively small area which it embraces. It is my belief that repeated high stresses within small areas soon become effective to break the affected fibers loose sufficiently to produce surface cracks and fissures which weaken the pin and render it more susceptible to further damage.

The end grain openings above and below the equator enable the ducts underlying the central area to absorb and lose moisture with changes in the humidity of the ambient atmosphere. This causes the wood in the central area of the pin to expand and contract and thus subjects it to stresses which tend to weaken undamaged wood and increase the damage of damaged wood.

Where the wood in the central area is in the form of one or more circular slab-like layers, as is the case in flat grain pins, a violent impact along the ball-line may (and often will) pinpoint a strong obliquely upward force along the lower edge of a slab. A large component of this force extends upwardly in a direction parallel with the plane of separation between adjacent slab-like layers and thus functions as a shearing force which tends to separate one or more of these layers from the pin.

The principal objects of the present invention are: to eliminate or substantially reduce the presence of relatively short chains of network fibers, end grain openings and slab-like layers in the impact zone of the pin; to effect a substantial reduction in the rate of damage development in the impact zone with a corresponding reduction in the frequency of pin replacement and in the expense occasioned thereby; and to provide a method for making a bowling pin which accomplishes the above objects.

Further important objects are: to provide a method for making a bowling pin having an impact zone surface essentially composed of substantial numbers of elongate chains of fiber networks and characterized by the substantial absence of relatively short chains, end grain openings and small slab-like layers; to provide a method for making the foregoing type of pin which is simple and easy to practice; and to provide a method of manufacturing the foregoing type of pin in volume at a commercially attractive and highly competitive price.

My invention essentially involves a method of making a circumferential wall-forming structure on or for a bowling pin product of predetermined size and shape and of the type conventionally having superposed upper and lower portions including upper head and neck portions and a lower spherical belly portion embracing a spherically convex impact zone extending in the horizontal direction circularly around and in the vertical direction convexly across the belly portion of the product pin and being more or less centered on an equator which encircles the product pin in the horizontal plane of its maximum belly diameter.

The foregoing objects of my invention may be attained in one aspect of my invention by molding (i.e., shaping in or on a mold) a long grain wood veneer starting sheet of appropriate size to form a shaped impact-zone segment having a spherically convex outer veneer surface, which extends convexly over a predetermined vertical distance corresponding at least to the vertical extent of the impact zone of said product pin and circularly over a predetermined horizontal distance corresponding to all or a desired fraction of the circumference of said impact zone and then bonding said shape-molded impact-zone segment to fix its outer veneer surface in said spherically convex shape. In place of a single layer, my invention also contemplates the use of one or more underlying plies, preferably in the form of one or more underlying layers of veneer. An all veneer impact zone segment will have a spherically concave inner surface to mate with the corresponding spherically convex portion of the product pin.

The shaped impact-zone segment may be molded either directly on the core of the product pin itself or as a prefabricated segment which is to be later assembled upon and bonded to the core of the product pin. When formed directly on the core, the starting sheet may be long enough to be wrapped completely around the circumference of the impact zone or it may be divided into a circumferential series of two or more shorter sheets or segments. When formed as a prefabricated segment, it should provide one-half or less of the circumference of the impact zone.

In either event, the spherically convex impact zone surface of the segment is composed wholly of long grain wood veneer. As a consequence, a bowling pin product made by my method has an impact surface essentially composed of substantial numbers of long chain fiber networks and characterized by the substantial absence of short chain fiber networks, end grain and/or small slab-like layers whereby it is less apt to incur severe impact zone damage and, therefore, requires replacement less frequently. The increased ability of this pin to withstand punishment not only lengthens its useful life but reduces its maintenance cost. Furthermore, it is easy to make this pin in commercial volume at a price comparable to that of conventional pins.

Hollow and solid core bowling pins made in accordance with the first aspect of my invention comprise (a) a bowling pin core having an impact-zone segment receiving area which is undersized by a predetermined amount; and (b) a long-grain veneer impact-zone segment to cover that segment receiving area and bring it up to a desired size. The manufacture of the core involves one series of manufacturing steps or operations while the manufacture of the veneer segment involves a different type and series of manufacturing steps, after which the parts may be assembled and bonded together.

Other important objects of my invention are: to provide a method for making an improved hollow or solid core bowling pin, in which the advantages, which I have obtained in the impact zone, may be obtained not only in the lower portion of the pin but also in part or all of the outer surface area of the upper portion thereof; and to provide for making an improved hollow bowling pin core, a method which is similar to that employed in manufacturing all veneer impact-zone segments of desired prefabricated shape.

The first of these latter objects of my invention may be attained by "facing" the entire pin with a single sheet or an appropriate number of segments of long grain veneer. Each segment may be molded on and bonded to the product pin core or it may be prefabricated (by molding it to the desired shape and bonding or fixing it in that shape separately from the pin) and thereafter bonded to the product pin core. Each segment may also have one or more underlying plies preferably in the form of one or more underlying layers of veneer.

The second of these latter objects of my invention may be attained by providing a plurality of flat segments of long grain veneer, each of which is large enough to extend vertically over substantially the entire belly portion of the product pin plus substantially all of the neck portion thereof, and, if desired, part or all of the head portion, assembling enough of these segments in superposed relationship to form the full wall thickness of the core, molding that assembly to the desired shape with an adhesive between adjacent layers and then drying or setting the adhesive to bond the layers together. Naturally, the outer layer of long grain veneer can be assembled and molded with and bonded to the core veneer to provide a prefabricated segment wall thickness equal to the full wall thickness of the product pin. An appropriate number of these multi-ply shaped segments can be assembled and bonded together as a horizontal succession extending circularly about the long axis of the pin.

Figure 6:
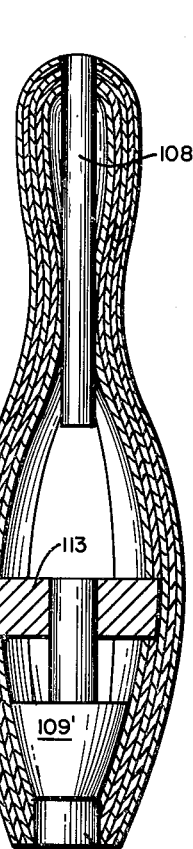
Figure 8:
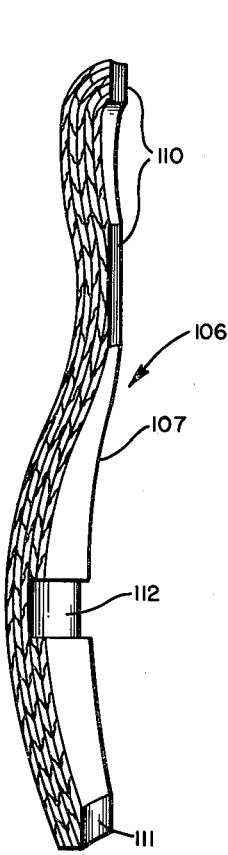
Figure 7:
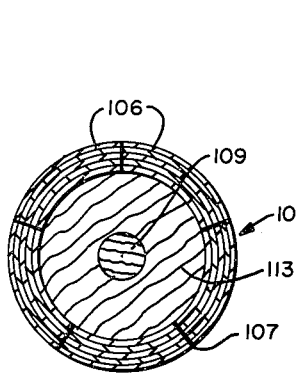
Figure 9:
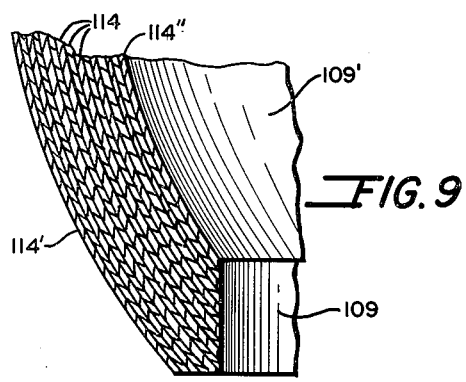
Figure 10:
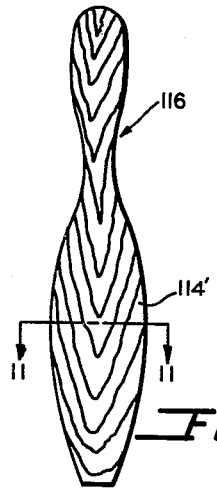
Figure 11:
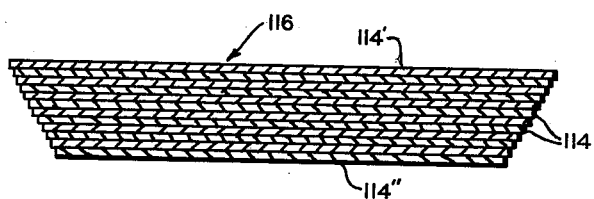
Figure 12:
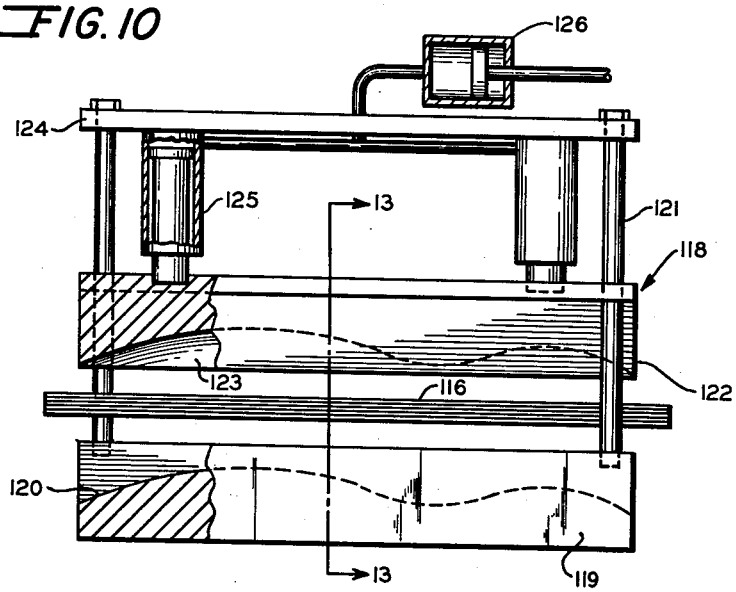
Figure 13:
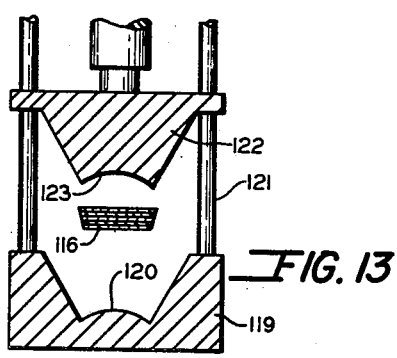
Figure 17:
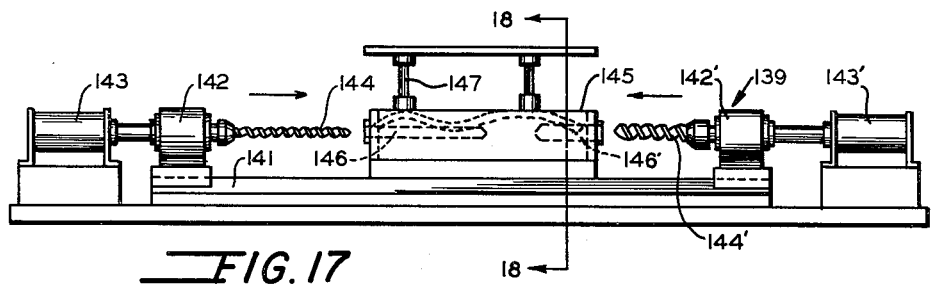
Figure 14:
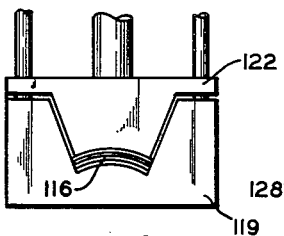
Figure 15:
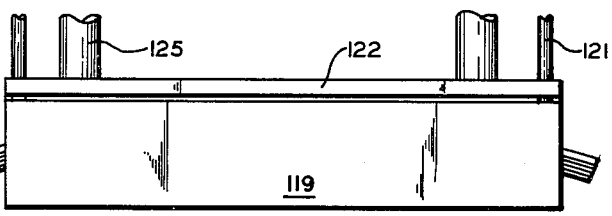
Figure 16:
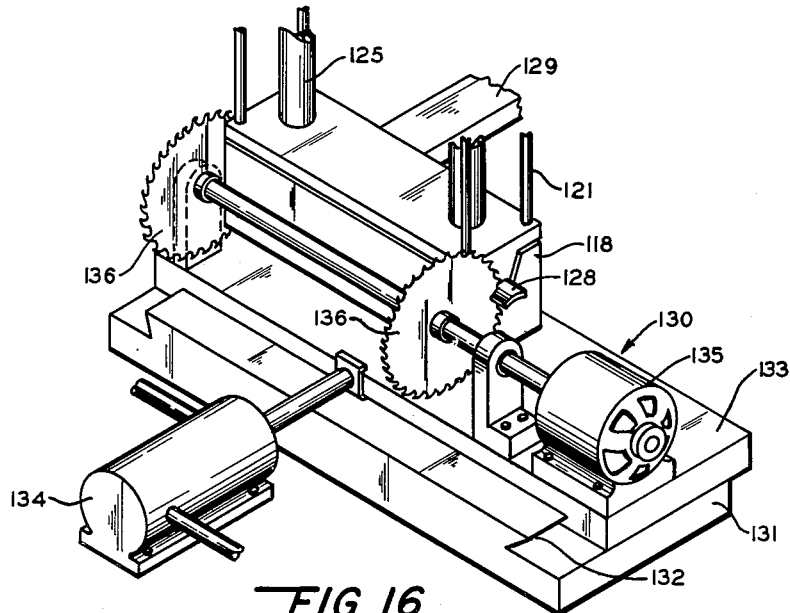
Figure 18:
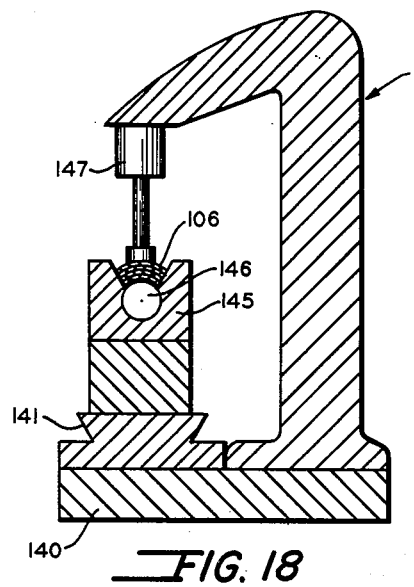
Figure 20:
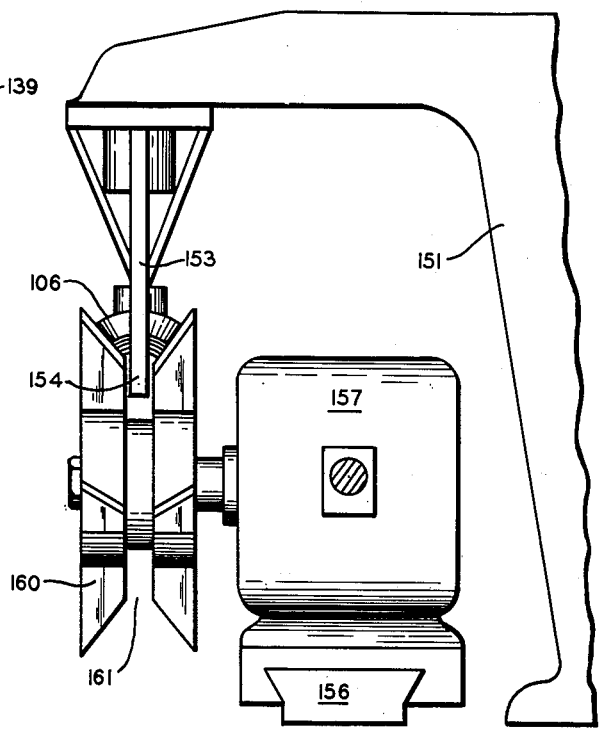
Figure 19:
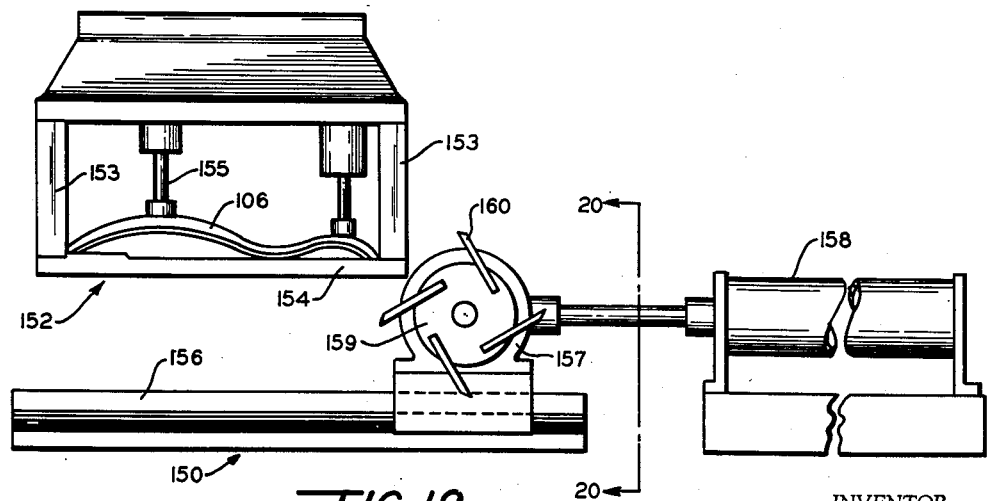

The invention is illustrated in the accompanying drawing wherein:

FIG. 1 is an elevational view of one embodiment of the novel bowling pin;
FIG. 2 is an enlarged section of FIG. 1 taken on line 2—2;
FIG. 3 is an enlarged section of FIG. 1 taken on line 3—3;
FIG. 4 is an exploded perspective view of the novel bowling pin of FIG. 1;
FIG. 5 is an elevational view of a second embodiment of the novel bowling pin;
FIG. 6 is a section taken on line 6—6 of FIG. 5;
FIG. 7 is a section taken on line 7—7 of FIG. 5;
FIG. 8 is a perspective sectional view of a bowling pin segment used in forming the bowling pin of FIG. 5;
FIG. 9 is an enlarged fragment of FIG. 6;
FIG. 10 is a plan view of a stack of precut veneer sheets for making a bowling pin segment;
FIG. 11 is an enlarged section taken on line 11—11 of FIG. 10;
FIG. 12 is a cut-away elevational view showing the stack located between the open dies of a press for shaping or forming the stack into the bowling pin segment;
FIG. 13 is a reduced section taken on line 13—13 of FIG. 12;
FIG. 14 is an end view of the press closed on the stack;
FIG. 15 is a side view of the press closed on the stack;
FIG. 16 is a perspective view illustrating trimming the excess ends from the segment clamped in the press;
FIG. 17 is an elevational view illustrating boring the opposite ends of the segment;
FIG. 18 is an enlarged section taken on line 18—18 of FIG. 17;
FIG. 19 is an elevational view illustrating planing or joining the radial edges of the segment; and
FIG. 20 is an enlarged section taken on line 20—20 of FIG. 19.

Broadly speaking, my invention resides in facing a bowling pin with long grain veneer. In the first embodiment of FIGS. 1–4, only the impact zone is faced with such veneer whereas, in the second embodiment, substantially the entire outer surface of the pin is provided by long grain veneer.

FIRST EMBODIMENT—FIGS. 1–4

In that aspect of my invention, the preferred form of which is exemplified by my first embodiment, the veneer may extend as follows: (a) vertically across the full height of the impact zone of the pin; (b) horizontally, either as a continuous strip extending completely around the circumference of the pin, or as a continuous succession of segments, which may or may not be prefabricated shaped segments, each extending around one-half or less of the circumference of the pin; and (c) depthwise over one or more layers of veneer embracing an outer fractional part of the full wall thickness of the impact zone of the pin.

In the preferred form, the long grain veneer extends: vertically as stated; horizontally as a continuous succession of segments prefabricated to a desired spherically convex outer surface shape; and depthwise over several additional layers of veneer, which cooperate with the outermost layer to form a prefabricated multi-ply segment of spherical concavo-convex form. Only the preferred embodiment will be described in detail.

The bowling pin 1, as illustrated in FIG. 1, is conventionally shaped, having a base 2, belly 3, neck 4 and head 5, all contained in a wooden pin body 6. This body can be made in the conventional way from either a single block of solid wood or a composite block of laminated wood. It can be conventionally turned in a lathe to the conventional bowling pin shape.

In this embodiment of my invention, a full sized pin is provided with an endless circumferential groove encircling the impact zone of its belly and with a horizontal succession of two or more veneer segments forming an endless band which fills that groove.

The circumferential groove 7 extends lengthwise completely around the circumference of the impact zone of the pin, widthwise completely across the width of the impact zone and depthwise a (normally uniform) distance sufficient to accommodate the overall thickness of the layer or layers of veneer used. It will be understood that so long as the depth of the groove is uniform, the floor of the groove 7 will curve in a spherical manner, i.e., curve convexly both horizontally along its length and vertically across its width. The circumferentially extending side walls of the groove are preferably cut to extend outwardly from the adjacent portion of the curved floor of the groove at an angle ranging from slightly less to slightly greater than a right angle.

While the veneer band 8 may be composed of two or more segments, three are preferred and therefore illustrated. They are designated by the numerals 9, 9' and 9". Before passing, it may be noted that the term "spherical segments" is herein broadly used to designate spheroidal segments as well as segments of a true sphere.

Each segment may be composed of a suitable number of veneer plies ranging from say 1 to 8 or more, depending, in part, on the thickness of the veneer. Flat cut or flat grain, edge cut or quarter grain and rift cut or rift grain veneers are readily available in various thicknesses including ⅛", ⅒", ¹⁄₁₂" and ¹⁄₁₆". A segment, composed of 5 veneer plies, may be readily made by stacking five long grain veneer sheets, one upon the other with a suitable adhesive between the sheets to form a flat assembly. To increase the resistance of the segment to splitting, the wood grain in any one sheet of this assembly should not extend parallel to the wood grain of the next adjacent sheet. To maintain a high resistance to delamination, the departure from "wood grain parallelism" should be minimized. Accordingly, each of the veneer sheets of the flat assembly is angularly positioned so that its wood grain extends, relative to the wood grain of adjacent sheets, at an angle ranging from about 5° to about 20°. The flat assembly is then compressed or molded to the desired shape and permanently held in such shape by setting or curing the adhesive used.

In its final shape, each segment has its innermost veneer face concavely shaped in a spherical manner and its outermost veneer face convexly shaped in a spherical manner. In other words, the bonded veneer assembly is of concavo-convex shape both vertically and horizontally. The inner face is concavely shaped in both directions to conform to the mating shape of the floor of the groove 7. The outer face is convexly shaped in the same manner to provide a horizontally and vertically convex outer surface throughout the impact zone in the conventional way. If desired, each segment, as a whole, may be cupped a little more concavely on its inner side and convexly on its outer side to facilitate final assembly as will be later explained.

In accordance with a particular feature of my invention, it is desirable to maximize the length of the wood grain employed in the segments. Accordingly, the segments themselves should be made of the largest practical size with their grain lines running generally in the direction of the largest dimension. While this is desirable, it is not essential so long as the wood fiber system is of substantial size. Thus, if a segment were to measure three inches vertically and four inches circumferentially, good results could be obtained with the wood grain running either horizontally or vertically, the best results being obtainable with the wood grain running circumferentially.

Before assembling the segments on the body 6, the edges are trimmed to whatever shape is necessary to secure flush abutment along all perimetric joint lines. By cupping the segments slightly more than their final assembled shape requires, it becomes relatively easy to assemble them on the body of the pin and then flatten them into flush face-to-face engagement with the floor of the groove. Once flattened, they are held in assembled relationship until the adhesive, bonding them to the body of the pin, is finally cured or set. During the flattening of the segments, their perimetrical edges will move outwardly and this movement is utilized to insure firm flush tight engagement of such edges with the adjacent edges of adjacent segments and with the adjacent portions of the side walls of the groove.

The multi-ply veneer band 8 thus formed by the segments has two very distinct advantages. In the first place, it is of uniform thickness; hence, its margins are as strong and damage resistant as any other part of the segment and much stronger than they would be if they were tapered down to a fine edge. In the second place, it is characterized by wood fiber systems of substantial area; hence, less subject to damage. This is due to the fact that when a group of fibers receive an impact at their center, for example, they tend to move inwardly at the point of impact and thereby exert a corresponding pull on the interconnected fibers of the rest of the system in a direction proceeding from the perimeter of the system toward the center of the impact. As a consequence, the fibers of the system are tensioned and the stress is distributed and dissipated throughout the entire extent of the system. The dissipation of the stress over a substantial area often avoids the damage which would occur if that same stress were localized, i.e., confined to a relatively small area, as is the case when the impact falls upon a fiber system of small size.

The veneer band segments may be made of natural wood veneer as heretofore indicated or they may be made of long fibered material, excelsior for example, which is compressed and bonded into veneer layers or veneer band segments of desired spherical concavo-convex form.

In one of the broader aspects of my invention, each segment of my first embodiment may not only be composed of single or multiple layers of veneer but it may also include what would normally be a segment of the core body or wall. For example, the depth of the groove 7 may be of uniform or non-uniform magnitude sufficient to accommodate the veneer plus a segment of other material such as core material. Thus, in FIGS. 2 and 3, the floor of the groove may be in the form of an axially straight cylinder so as to extend along dotted line 10, in which event the core material, which corresponds to a segment and which lies between the innermost veneer face of the segment and dotted line 10, would be separated from the central portion of the core proper and bonded to the innermost veneer face of the segment to form an integral part of the segment. Obviously a multitude of variations of this character will suggest themselves.

SECOND EMBODIMENT—FIGS. 5-9

In that aspect of my invention, the preferred form of which is exemplified by my second embodiment, the veneer may extend as follows: vertically over substantially the entire belly portion of the pin plus substantially all of the neck portion thereof and, if desired, part or all of the head portion; and horizontally and depthwise as in the first embodiment, except that, depthwise, it additionally embraces wall thicknesses ranging up to and including the full wall thickness of the impact zone of the pin.

In the preferred and illustrated form of my second embodiment, the veneer forms a multi-ply segment prefabricated to a desired shape and extends as follows: vertically across the full height of the pin; horizontally around less than one-half of the circumference of the pin; and depthwise through the full wall thickness of the pin. Only the preferred form of this embodiment will be described in detail.

The second bowling pin embodiment 101 shown in FIG. 5 is of a coventional shape and includes a base 102, belly 103, neck 104 and head 105. It is hollow and is composed of five identical circumferential segments 106 having outwardly diverging side edges 107 which are edge-joined together along joints lying in radial planes extending through the longitudinal axis of the pin 101. Each segment forms 72 degrees of the pin's circumference. It is preferable to have an odd number of segments so that no two joints between the segments will be diametrically aligned.

The segments 106 are assembled around an upper cylindrical dowel or core rod 108 extending through the head 105 and neck 104 and a lower dowel or core rod 109 which varies in diameter along its length and extends upwardly from the pin base 102. The oppositely disposed interior surfaces at the upper end of the head 105, of the neck 104 and at the lower end of the base 102 are circularly cut or bored to correspond to the curvature of the core dowel rods 108 and 109, the bored inner surfaces of both the head and the neck being indicated by the reference number 110 and the bored inner surface of the base being indicated at 111 in FIG. 8. The lower dowel 109 is provided with an enlarged portion 109' intermediate its ends which conforms to and supports the inner sides of the segments 106 adjacent their lower ends. The inner sides of the pin segments are grooved at 112, along the widest diameter or the ball line of the pin belly 103, to receive a disc 113, which supports and bridges the hollow pin 101 across its belly 103. The upper end of the lower dowel rod 109 is reduced in diameter and extends upwardly into a central hole in the disc 113. Glue or other suitable adhesive is used to bind the segments 106 to each other, to the dowel rods 108 and 109 and to the disc 113.

The segments 106 are laminated walls composed of a plurality of wooden veneer plies 114 bonded together and pressed into the necessary compound curvature shape of a bowling pin. Preferably, the outer ply 114' and the next adjacent ply, as seen in FIG. 9, are composed of hard maple and are arranged with their fibers running longitudinally and extending for the length of the segment 106. As the wood fibers follow the contour of the segment, instead of being cut, the outer surface of each segment is composed exclusively of long grain wood.

In one specimen of the second embodiment 101, each segment 106 included twelve plies of 1/16 inch veneer, making the segment walls 3/4 inch thick. In that specimen, the upper dowel rod 108 was 1/2 inch in diameter and the lower end of the lower dowel rod 109 was one inch in diameter. In other specimens, seven to nine plies of veneer ranging from 1/8 to 1/12 of an inch in thickness were used, the average wall thickness ranging from 3/4 of an inch to 7/8 of an inch more or less.

It will be appreciated that a multi-ply veneer segment 106, prefabricated in accordance with the second embodiment of my invention, provides the full wall thickness of a hollow bowling pin 101 vertically over the entire height of the pin and horizontally over a circumferential fraction which may, of course, vary if desired.

METHOD—FIGS. 10–20

A suitable method of making the bowling pin 101 comprises: (1) cutting each flat veneer ply to the required segment shape; (2) applying adhesive to the plies; (3) superposing a plurality of plies to form a stack; (4) compressing the stack between dies to the spherical concavo-convex shape required by the segment and then holding it in such shape until the adhesive cures; (5) trimming the segment to remove excess materials from its ends and to provide it with slanted edges; (6) boring the inner wall of the segment along its base, neck and head to fit the dowel rod which is to be vertically arranged in the long axis of the pin; (7) planing the edges of the segment; (8) grooving the inner wall of the segment horizontally along its equator; (9) bonding the parts in assembled relationship to form a complete unitary pin; and (10) finishing the pin in any suitable way as by sanding it and then applying suitable coating materials.

*Cutting Each Ply*

Each ply 114 of the segment 106 is cut to its approximate shape and size prior to being assembled with the other plies to form the segment. Because of the outwardly diverging side edges 107 of the segment 106, each of the plies 114 is progressively wider proceeding from the inner ply 114" to the outer ply 114'. Consequently, in forming a single segment of, say 12 plies, it is necessary to cut 12 individually shaped veneer pieces or plies 114, each having a width different from the widths of the other plies. The plies 114 are cut from sheets of wood veneer by conventional means such as by die stamping or die cutting rollers.

*Applying Adhesive*

It is necessary to apply adhesive to the contacting faces of the plies 114 before assembling them into a stack or tier 116. This can be done manually by the use of a paint brush or mechanically by conventional means. For example, when the plies are cut by die cutting rollers, the adhesive may be mechanically spread on them as they are discharged from the rollers.

*Assembling Plies*

A stack 116 of plies 114 is shown in FIGS. 10 and 11 and is formed by assembling the plies 114 with the widest and outer ply 114' on top and the remaining plies progressively decreasing in width as they are spaced further below the outer ply 114'. This provides the stack 116 with upwardly diverging side edges as shown in FIG. 11. The plies may be assembled by hand or by conventional mechanical means. Once the stack 116 is assembled, it is ready to be die compressed to the shape of the segment 106.

*Die Compressing Stack*

The die compressing press 118 shown in FIGS. 12 to 15 includes a lower female die 119 having upwardly diverging inner walls and a bottom inner surface 120 configurated to the inner surface of the segment 106. A plurality of guide posts 121 project upwardly from the top of the female dies 119 with a post 121 at each corner.

A male die 122 is slidably mounted on the posts 121 for vertical reciprocation and carries downwardly converging outer walls corresponding to the upwardly diverging inner walls of the female die 119 and a bottom outer surface 123 configurated to the outer surface of the segment 106. When the male die 122 is seated in the female die 119, the bottom inner surface 120 is spaced from the bottom outer surface 123 an amount equalling the thickness of the segment 106. In the example segment embodiment, this thickness is 3/4 inch.

For forcing the male die 122 into the female die 119, a plate 124 is fixed at the upper ends of the guide posts 121 and a pair of hydraulic jacks 125 are interposed between the male die 122 and the plate 124. The jacks 125 are simultaneously operated from a pump 126, schematically shown in FIG. 12.

The dies 119 and 122 are arranged so that the angle between their divergent walls is greater than the arc spanned by the finished segment 106. For example, when the segment 106 spans 72 degrees of the bowling pin periphery, as the described segment does, the dies 119 and 122 are formed to span more than 72 degrees. This is necessary so that the segment formed in the dies can later have its edges 107 planed down and so that there will be a slight clearance between the divergent walls of the female die and the plies 114 when compressed.

In operating the die press 118, the male die 122 is raised and an assembled stack 116 of plies 114 is laid in the female die 119, before the adhesive between the stacked plies cures or hardens, and the pump 126 is operated to actuate the jacks 125 and move the male die 122 downwardly into the female die 119. After the male die 122 is completely seated, it is maintained in this position until the adhesive in the stack 116 is cured. This curing can be aided by the application of heat by conventional means.

In the seated position of the male die 122, the compression of the stack 116 is limited to being between the die surfaces 120 and 123 while the edges of the plies 114 in the stack are free to move outwardly. This freedom of the stack edges is provided by the open ends of the dies and by the larger angle spanned between the divergent walls of the female die 119, as compared to the arc spanned by the segment, which allows a clearance between the side edges of the stack and the adjacent divergent die walls.

*Trimming Ends*

Normally the stack 116 is dimensioned so that, after it is die compressed, it is somewhat longer than the finished segment 106. The excess ends 128 of the compressed segment 106 are illustrated in FIG. 15 projecting from the press 118. These ends 128 can be trimmed after the segment 106 is removed from the press 118, or, preferably, they can be trimmed while the segment 106 is still locked in the press. This operation is shown in FIG. 16. The press 118 is supported on the end of a cantilever arm 129 and a trim saw 130 is horizontally reciprocated across the ends of the press 118.

The trim saw 130 includes a stationary base 131 having dovetail guide surfaces 132 and a reciprocating plate 133 having mating dovetail guide surfaces sliding on the surfaces 132. The plate 133 is horizontally reciprocated by a hydraulic jack 134. An electric motor 135 is mounted on the plate and carries a pair of spaced saw blades 136 fixed on its shaft and spaced apart a distance to span the press 118 and trim the excess ends 128 of the segment 106 at the proper location.

In operating the saw 130, the jack 134 is retracted, withdrawing the plate 133 to its rearward position, and the press 118, supported on the arm 129, is located between the horizontal paths of the saw blades 136. After the press 118 is properly located, the electric motor 135 is energized to spin the saw blades 136 and the jack 134 is operated to reciprocate the saw blades 136 across the ends of the press 118. This movement of the blades 136 cuts the excess ends 128 from the segment 106.

*Boring Inner Wall*

The next step in the segment making operation is the boring of the inner surfaces of the head 105, neck 104 and base 102 to form the arcuate inner surfaces 110 and 111 that fit around and engage the dowel rods 108 and 109, respectively.

FIGS. 17 and 18 show this step being performed on a boring machine 139 comprising a longitudinal base 140 having dovetail guide surfaces 141 extending along its length and a pair of drill motors 142 and 142' slidably mounted on the guide surfaces 141 adjacent each end of the base 140. A pair of hydraulic jacks 143 and 143' are located at the ends of the base 140 to move the motors 142 and 142' toward each other. Chucks are mounted on the shafts of the motors 142 and 142' and appropriate sized drills 144 and 144' are fixed in the chucks. A V-shaped segment holding jig 145 is mounted in the middle of the base 140 for holding a segment properly while the drills 144 and 144' are moved toward each other to bore the segment inner surfaces. The jig 145 has appropriate sized holes 146 and 146' at each end to receive the drills 144 and 144' and a clamping mechanism 147 is mounted over the jig to press down on the segment 106 and hold it stationary in the jig 145.

In operating the boring machine 139, the jacks 143 and 143' are retracted to move the drill motors 142 and 142' to their rear positions and the segment clamping mechanism 147 is opened. A segment 106 is laid in the jig 145 with its outer side facing upwardly and with its diverging edges 107 seating against the diverging walls of the jig 145 and the clamping mechanism is operated to engage and clamp the segment 106 in the jig. After this, the drill motors 142 and 142' are energized and the jacks 143 and 143' are operated to move the drills 144 and 144' toward each other. The drills enter the holes 146 and 146' and, as they travel through the holes 146 and 146', bore or cut the arcuate surfaces 110 and 111 on the inner side of the segment 106. The drills only touch and cut the segment 106 at the inner surfaces of the head 105, the neck 104 and the base 102 while the remaining surfaces remain uncut.

*Planing Edges*

This operation is shown in FIGS. 19 and 20 and comprises supporting the segment 106 in a stationary position while a rotary planer or joiner is moved along its length.

The planing machine 150 includes a stand 151 having a cantilever arm supporting, at its outer end, a U-shaped support 152 including legs 153 projecting upward and fixed to the stand 151 and a bight 154 bridging the legs 153 at their lower ends. The top surfaces of the bight 154 are transversely curved to correspond with the arcuate inner surfaces 110 and 111 of the segment 106 formed by the previous boring operation and one end (the left end in FIG. 19) of the bight 154 is stepped upwardly to correspond to the larger diameter curved surface 111. A segment is supported on top of the bight 154 by clamping mechanism 155 interposed between the arm of the stand 151 and the segment.

A dovetail shaped guide track 156 is located below the stand 151 and extends parallel to the bight 154. An electric motor 157 is slidably mounted on the track 156 and is reciprocated along the track by a hydraulic jack 158. A planer wheel 159 is fixed to the shaft of the motor 157 and carries a series of V-shaped planer blades 160 dimensioned and located to plane the side edges 107 of a segment 106 supported on the bight 154 to exactly the correct size or arc. For example, when the finished segment is to span 72 degrees, the blades 160 cut the segment down to exactly 72 degrees. The planer wheel 159 has a peripheral groove 161 midway between its ends to allow clearance for the stand bight 154 as the wheel is moved along the bottom of the bight and segment.

In operating the planing machine 150, the jack 158 is fully retracted, the clamp mechanism 155 is opened and a segment 106 is laid on top of the bight 154 with its arcuate surfaces 110 and 111 engaging the corresponding surfaces on the bight 154. The clamp mechanism 155 is then clamped on the segment to hold it on the bight 154. The motor 157 is energized to spin the planer wheel 159 and jack 158 is operated to move the spinning planer wheel along the side edges 107 of the segment 106. As the planer blades 160 are set to cut the edges 107 along a pair of planes diverging from the longitudinal axis of the bowling pin which the segment 106 will form and as the planer wheel moves parallel to this longitudinal axis along the segment, the segment 106 is cut down exactly to span a predetermined arc of the bowling pin periphery.

*Grooving Inner Wall*

The operation of placing the groove 112 in the segment 106 is not illustrated. This may be performed by conventional means and methods. For example, it may be carried out by holding the segment 106 stationary while swinging a rotary cutter of appropriate shape transversely across the inner face of the segment belly 104.

Assembling Bowling Pin

The assembly of a plurality of the segments 106 around the respective core dowel rods 108 and 109 and a disc 113 can be performed either manually or by machine. Prior to assembly, adhesive is applied to the required number of segments 106 along their side edges 107, their inner arcuate surfaces 110 and 111 and the groove 112. The disc 113 is also impaled on one end of the dowel rod 109 with adhesive between the engaging surfaces. Now, the segments 106 are assembled around the dowel rods 108 and 109 and disc 113 and clamped in assembled position until the adhesive cures. After this, the pin 101 is finished by sanding it and applying a suitable coating material.

MODIFICATIONS

It will be appreciated that my prefabricated segment for a hollow bowling pin comprises a segment wall extending vertically through the head, neck and impact zones of the proposed pin and horizontally over a predetermined fraction of the circumference thereof with its outer and inner surface shapes corresponding to those of the proposed pin. While I have described this segment as being wholly composed of multi-veneer plies, it will be appreciated that it may be composed of an outermost wood veneer ply, which provides the entire outer surface of the segment and is characterized by long grain, and an underlying body, the outermost surface of which conforms to the shape of said veneer ply and is bonded thereto with its innermost surface being of any suitable shape.

The terms "long-grain veneer" or "long-grain veneer sheet" are used in their conventionally accepted sense to designate a veneer sheet of initial uniform thickness, the opposite faces of which are essentially composed of substantial numbers of elongate chains of wood fiber networks and characterized by the absence of substantial numbers of relatively short chains, end grain openings or small slab-like layers. By "initial uniform thickness," I mean that it was of conventional uniformity in thickness before being molded to the desired shape either in forming a prefabricated segment or in applying the veneer to and pressing it against the pin. In the finished product of this invention, whether it be in the form of a prefabricated segment or of a complete bowling pin, the layers of the veneer may not be as uniformly thick as they initially were because the stresses to which the present invention subjects each veneer layer may attenuate, compress or otherwise reduce the thickness of some portion of the veneer. Similarly, the sanding operation may reduce the thickness of the outer layer more at some points than at others.

Having described my invention, I claim:

1. A method of making a circumferential wall-forming structure for a wood bowling pin product of predetermined size and shape and of the type having superposed upper and lower portions including upper head and neck portions and a lower spherical belly portion embracing a spherically convex impact zone extending in the horizontal direction circularly around and in the vertical direction convexly across the belly portion of the product pin and being more or less centered on an equator which encircles the product pin in the horizontal plane of its maximum belly diameter, comprising: molding a long grain wood veneer sheet of appropriate size to form a shaped impact-zone segment having a spherically convex outer veneer surface extending convexly over a predetermined vertical distance corresponding at least to the vertical extent of the impact zone of said product pin and circularly over a predetermined horizontal distance ranging from a fraction of the circumference of said impact zone to the full circumference thereof; and bonding said shape-molded segment to fix its outer veneer surface in said spherically convex shape.

2. The method of claim 1 wherein: said molding step is performed to form a prefabricated impact-zone segment having an outer long grain veneer surface extending circularly over a distance not greater than one-half of the circumference of said impact zone.

3. The method of claim 2 wherein: said molding step is performed on a plurality of superposed long grain wood veneer sheets to form a multi-ply segment having said spherically convex outer veneer surface; and said bonding step is performed to fix said multi-ply segment into a unitary segment having an outer surface of said molded shape.

4. A method of claim 2 wherein: said molding step is performed on a plurality of superposed long grain wood veneer sheets to form a multi-ply segment having an outer veneer surface extending vertically over a distance, and having a shape, corresponding to the height and shape of said upper and lower portions of said pin; and said bonding step is performed to fix said multi-ply segment into a unitary segment having an outer surface of said molded shape.

5. The method of claim 4 for use in producing a hollow bowling pin of said type having a wall thickness of predetermined order, wherein: said molding step is performed on a sufficient number of said superposed long grain wood veneer sheets to form a multi-ply segment which extends depthwise over a distance substantially equal to the said wall thickness of said product pin.

6. The method of claim 5 including: assembling said sheets to form a stack of superposed plies of wood with an uncured adhesive interposed between adjacent plies and with one of said long grain wood veneer sheets forming one outer face of said stack; performing the molding step by pressing said one outer face of said stack against a die surface having a spherically concave shape corresponding reversely to the spherically convex shape desired in said molded segment; and performing the bonding step by holding said stack pressed against said die surface until said adhesive cures to bond said plies together into an integral segment.

7. The method of claim 5 including: trimming the vertical edges of said segment to reduce it transversely to span a predetermined portion of the circumference of said product pin.

8. The method of claim 7 comprising: assembling a circumferential succession of said unitary segments together to form the circumferential wall of said product pin; and bonding said segments in assembled relationship.

9. A method of making a bowling pin of predetermined shape comprising: providing a body having a base, belly, neck and head together with a groove extending with a groove extending lengthwise completely around the circumference of the ball impact zone of the pin, widthwise completely across the width of the impact zone and depthwise a uniform distance equal to the overall thickness of at least two layers of veneer; filling that groove with a multi-ply wood veneer band of substantially uniform thickness and composed of a circumferential series of prefabricated segments which are concavo-convexly curved in both the horizontal and vertical directions and have their wood fibers extending parallel to and conforming with the outer surface of said segments; and adhesively securing the band permanently to said body.

10. The method of claim 9 wherein: each prefabricated concavo-convex segment is cupped sufficiently to require its being flattened slightly in order to have flush face-to-face contact with the floor of the groove; and holding said segments in such flattened condition while they are being permanently bonded to the floor of said groove.

References Cited in the file of this patent

UNITED STATES PATENTS

| | | |
|---|---|---|
| 235,799 | Naylor | Dec. 21, 1880 |
| 820,490 | Goff et al. | May 15, 1906 |
| 1,227,248 | Crane | May 22, 1917 |
| 2,629,596 | Luedtke | Feb. 24, 1953 |